Figure 1:
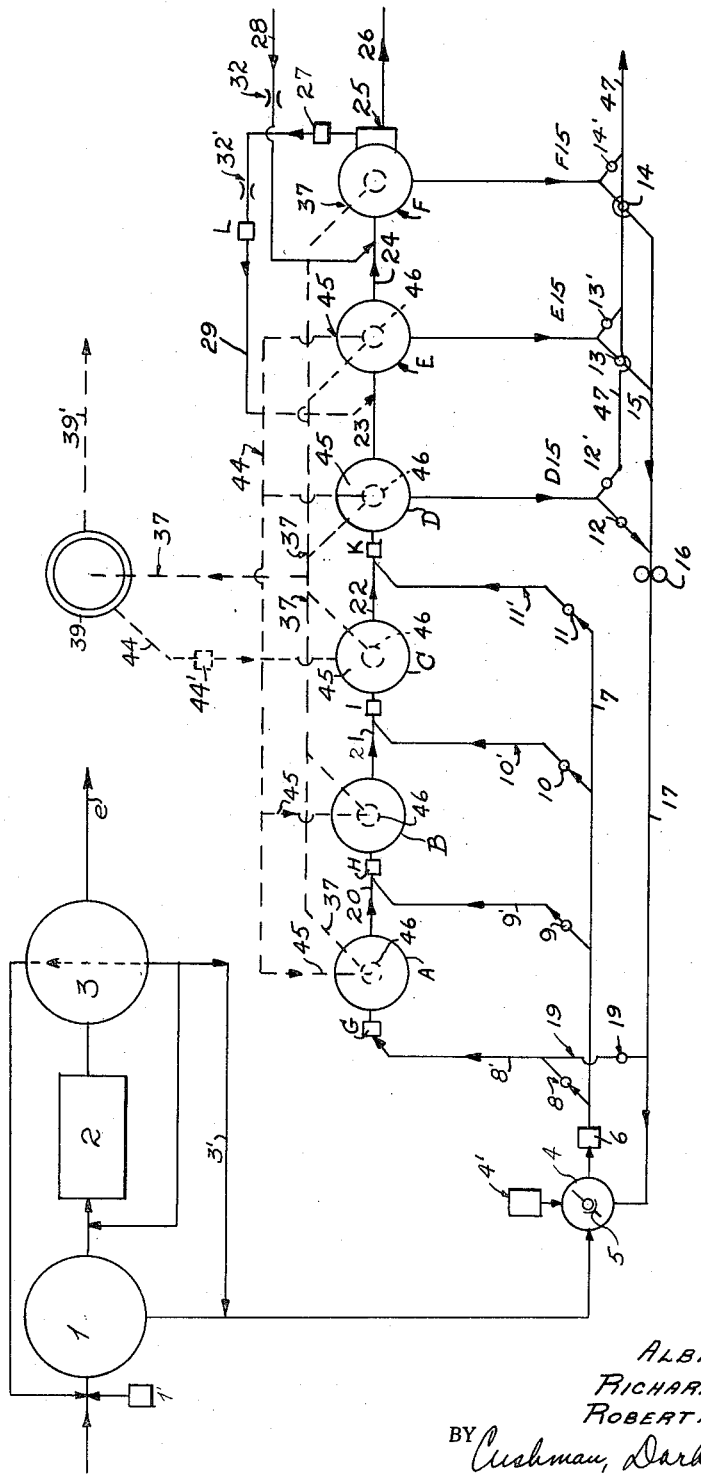

July 7, 1959 A. L. GENTER ET AL 2,893,957
SEWAGE SLUDGE DIGESTION PROCESS
Filed Jan. 18, 1955

INVENTORS
ALBERT L. GENTER
RICHARD R. KENNEDY
ROBERT M. KENNEDY
BY Cushman, Darby & Cushman
ATTORNEYS

United States Patent Office 2,893,957
Patented July 7, 1959

2,893,957
SEWAGE SLUDGE DIGESTION PROCESS

Albert L. Genter, Baltimore, Md., and Richard R. Kennedy and Robert M. Kennedy, San Francisco, Calif.

Application January 18, 1955, Serial No. 482,625

16 Claims. (Cl. 210—5)

Our invention relates to sewage treatment and more particularly to a novel process and system for shortening the time required in the mesophilic temperature range for the anaerobic digestion of organic solids collected in various treatment processes and the concentration of both the digesting and digested solids during the sludge digestion process.

Much thought and research have been expended on reducing the customary time by vigorous agitation of the digestion tank contents on the one hand, and, on the other, by concentrating the fresh solids prior to introducing them to the digestion space. This latter thought, based upon the theory that the sludge moisture takes up digestion space and reduces the ratio of water to sludge solids before digestion, will likewise reduce the space and time required for stabilization of the digestion process.

The well-known authoritative text book entitled Sewage Treatment (copyright 1940), by Imhoff and Fair (page 215), states: "Within the limits encountered in practical operation of digestion tanks the rate of digestion is the same for thin and thick sludge. The sludge liquor, however, does take up space and so decreases the available time of detention in a tank of given dimensions. If the incoming fresh sludge contains more than the normal amount of water, the basic tank capacity must be increased in order to provide for storage of this water between the time of adding sludge and the time of removing a corresponding amount of excess sludge liquor. An adequate period of quiescence is necessary before the excess of water can be decanted satisfactorily."

Quiescent storage takes place in the second stage digestion tank while active digestion takes place in the heated first or active stage where no thought is given to separation of clear liquor. Sludge elutriation either directly in the second digestion tank, according to Genter U.S. Patent No. 2,259,688, or between the active and inactive digestion stages with completion of solids sedimentation in the inactive stage according to the Genter-Kennedy Patent No. 2,528,649, is a material aid to shortening the period required for quiescent second-stage digestion and diminishing the total digestion space while materially increasing the clarity of the final sludge liquor. However, in these patented improvements no thought is given to reducing the primary digestion space, or to increasing the gas yield during digestion.

Recent digestion improvements involving increasing the concentration of solids in the fresh sludge introduced to digestion tanks have demonstrated that the time required for active digestion can be definitely diminished by paying attention to two factors: (1) vigorous agitation of the digesting mass in order to effect equal distribution of the partially and more completely digested materials with the inoculating seed throughout the active digestion tank, thus obtaining the benefit of the tank volume by preventing the formation of pockets of incompletely digested materials in zones of lower anaerobic activity, and (2) more frequent pumpage of seeded, undigested material into the active digesting mass.

Modern digestion tanks are usually constructed to act in two separate stages, the first-stage active digestion tank or tanks operating at elevated temperature ranges followed by a second-stage tank or tanks wherein the separation of the relatively clear liquor from the heavier settleable sludge solids takes place at lower temperatures. This was a relatively slow process until the advent of the use of the methods set forth in the above-mentioned patents issued to Genter and Genter and Kennedy. However, in designing plants having two-stage digestion the modern tendency remains to keep the tank dimensions large and reduce the number of digestion tank units installed while increasing the agitation of the primary tank contents. Large units, even with only a few installed in any plant, have several disadvantages, e.g., costly construction inherent to larger structures, lack of operating flexibility in case any single unit is cut out of service for cleaning or structural repairs, the employment of either numerous mechanically operated stirrers or large circulation pumps in the first-stage digestion tanks. The employment of stirrers or pumps to insure thorough sludge agitation to avoid inactive zones or the employment of compressed digestion gas for thorough agitation of the active tank contents can, when operating in large tanks, tend to destroy the natural sludge floc. This may result in the bulking or increasing of the final volume of the digesting and digested product which is not only inimical to proper, rapid solids concentration in the second-stage digesters, but tends to produce dirtly digester liquor in these tanks.

Our present invention has as some of its objects the reduction of the ratio of the digestion tank volume to the volume of the organic matter of the sludge being subjected to the more rapid active digestion process while insuring the rapid gravity segregation of the digested solids according to the elutriation principles evolved by the special, improved use of the aforementioned Genter and Genter-Kennedy patents. This is primarily accomplished by dividing the first stage digestion units into several successive units of definitely smaller dimensions than present practice provides. Preferably, there should be four digestion units in the first stage, although three units will suffice depending, of course, upon local conditions. As disclosed in other modifications, more than four digestion units have also been employed in this first or active stage.

Use of these multiple digestion units insures a more frequent and regular feed of inoculated fresh sludge to them. Moreover, this permits a wider range in the chemical and biochemical properties of the recirculated seed or inoculum while combining the whole with better gravimetric segregation of the digesting and digested solids which is accomplished by novel alterations in the less active secondary, intermediate and final stages of sludge washing and solids concentration in the secondary digestion stage or stages and the collection of all available digestion gas with the possible concentration of the methane in the digestion gas.

Usually the insurance of a relatively frequent feed of fresh sludge to rather large digestion tanks is not without difficulties even in large plants because the collection of fresh solids in sedimentation tanks does not occur at a uniform rate during any twenty-four hour period. The hourly variation in sewage flow and its variation in composition of settleable decomposable matter varies greatly. If the sewerage also collects storm water, the variation between wet and dry weather flows is very great. With a sewer system collecting domestic sewage only, the volume of flow and its strength generally reach a maximum in the forenoon. Therefore, in most sewage treatment plants treating only domestic sewage, the maximum hourly flow and minimum hourly flow may vary from 5.5 to 3 percent of the average daily flow. With plants treating combined sewage the hourly variations will be considerably greater. According to the sewerage system and local conditions the pumpage of fresh sludge to the digestion system is then set between two average limits, i.e. the maximum and minimum hourly flow and the mean average frequency of pumping may vary from once every two hours to more frequent intervals. If the frequency can be made more often, better digestion results are obtained. In our invention this is made possible by conducting the fresh sludge at any desired irregular intervals to a sludge distribution well connected with the multistage digestion tanks. Pumping from this distribution well may then be set at a smaller per minute rate over more frequent or even relatively constant intervals.

In view of the fact the fresh sludge should be well seeded with well digested and stabilized culture, the culture is likewise conducted to the distribution well, where it is thoroughly mixed with the fresh sludge in order to provide the properly cultured medium and to prevent foul odors of incorrectly seeded fresh sludge. Returning ample quantities of well digested seed culture to a quantity of fresh sludge not only regulates the hydrogen ion concentration (pH) of the seeded mixture but moreover destroys odors when stirred into the mixture mechanically or with compressed air bubbles.

We have discovered that the reduction of the ratio of the digestion tank volume to the total quantity of sludge held in the digestion tank system is accomplished by a combination of the following important factors: (1) the division of the digestion process into successive, multiple stages together with (2) copious, frequent seeding of the added fresh sludge, (3) distribution of the seeded mixture into the digesting material throughout the numerous small tanks under proper temperature control in order to obtain full benefit of the tank volume so as to prevent both short-circuiting of partially digested material through the tank system and the formation of zones of unequal digestion activity. This is accomplished by circulating the seeded digesting mixture at a rate which insures thorough turbulence of same in order to purposely prevent gravity segregation of the suspended solids. "Turbulence" is herein defined according to the "Glossary of Water and Sewage Control Engineering Issued under the Joint Sponsorship of American Public Health Association, American Society of Civil Engineers, American Water Works Association and Federation of Sewage Works Association, 1949 Edition": namely "A state of flow of water wherein the water is agitated by cross currents and eddies, as opposed to laminar, quiet, or quiescent flow." Furthermore, (4) progressive washing of the digested solids and concentration of the washed digested solids by purposely reducing the velocity of the suspension to that of quiescent flow in order to promote gravity segregation of the washed and degassed suspended solids. The seeding method used may be termed step-loading of the successive digestion units. By step-loading is meant loading of the multiple tanks with seeded material at one or more different points in the tank series and at relatively frequent intervals so the bacterial activity is constantly and evenly distributed throughout the multiple tank system. Above all, it means the practically constant recirculation of a measured fraction of the total bacteriologically active seed material at controlled temperature.

Thus the novel design of the tank system and the novel method of feeding active sludge culture mixed with fresh sludge to this system and washing the digested sludge solids result in rapid progressive anaerobic decomposition of the organic fraction of the sewage solids, progressive gasification, progressive cleansing of the settleable and semi-settleable solids of occluded gases by progressive solids washing, progressive segregation of degassed solids, progressive movement of such solids through successive digestion and storage chambers, progressive collection of digestion gases, progressive enrichment, of such gases in combustible gas ingredients, progressive seeding of the introduced fresh solids with well digested material and the elimination of bothersome scum accumulations common to present plant practice.

Due to previous experience with digester tank capacities and dimensions some State agencies have set minimum digester capacity requirements in terms of cubic feet capacity per capita served by any plant. This space ranges from about one cubic foot per capita at about 26° C. temperature for plain sedimentation plants to three or more cubic feet per capita for combined primary and waste activated sludges. The present invention will materially reduce such empirical capacity requirements and construction costs.

Other important operating economies that also result from our invention are heavier final digested product occupying less space than common to prior practice, clearer final sludge liquor, and smaller final sludge volume to be disposed. This means increased economy in ultimate sludge disposal whether by sandbed or mechanical dewatering, transportation on to the land or burial at sea.

The accompanying drawing is primarily diagrammatic and illustrates how our invention can be put into practice. Construction details and plans relating to building economy may be altered by those skilled in the art to suit local terrain without departing from the novel principles disclosed herein.

Figure 1 is a flow diagram that presents exemplary illustrations of our digestion system and involves six progressive units; the first four being in the primary stage and the latter two in the secondary stage, of sludge digestion and solids concentration.

More specifically, there is disclosed the step-loading of successive tanks or units A, B, C and D with seeded fresh sludge mixture followed by washing the digested sludge in relatively fresh water and gravimetric segregation of the washed and digested solids in tanks or units E and F successively, or in the last tank F alone.

Shown also is the selective return of recirculating seed material. Said seed material is washed or unwashed digested solids or mixtures of both, or digester supernatant or elutriate from tanks D, E and F in various mixed proportions. The seed material also encompasses various quantities of recirculated seed, fresh seed culture and mixtures of both. The seed material has in it the anaerobic bacteria essential for proper digestion.

In Figure 1, the various methods of collecting fresh sludge by sedimentation from untreated and treated sewage are indicated by diagrammatic frames 1, 2 and 3. The simplest sewage treatment process is plain sedimentation, indicated by circle 1, wherein the suspended solids removed by plain sedimentation equal the fresh solids digested. If the method of chemical precipitation 1' is used, more chemically precipitated solids will be added to plain sedimentation and more sent to digestion. More thorough treatment steps include a trickling filter treatment, indicated by rectangle 2, and final settling indicated by circle 3, wherein secondary solids are collected and added by route 3' to the primary sedimentation sludge and sent to digestion. The alternative method or methods of trickling filter treatment are the various preliminary methods in preparing sludge for subsequent anaerobic treatment. They result in the largest quantities of combined sludge (indicated by upper return loop from secondary settling tank 3 to plain sedimentation tank 1) per thousand inhabitants sent to digestion. This is chiefly due to the amount of water associated with the greater quantity of sewage solids produced. However, our combination of high-rate digestion and solids concentration processes obtained by solids degassing and elutriation materially shrinks the ultimate amount of sludge going to final disposal.

Although the various sedimentation tanks used for collecting fresh solids destined for rapid digestion may be either continuously or discontinuously operated, the resulting fresh sludge is first transported to a distribution well 4 at any desirable or convenient interval. Then this fresh sludge at relatively frequent or even constant intervals is fed from this well to the multi-stage sludge digestion system. Continuous feeding from the well to the digestion system is also practicable. The use of a distribution well enables periodic or discontinuous feeding of the fresh sludge and proper seed material into the well at convenient intervals and then at timed frequent intervals, varying from once every two hours to more frequent intervals. This procedure also permits drawing the sludge from the well and pumping or otherwise feeding it to the multi-stage digestion tanks mixed with the seed material that has been returned to the distribution well. Mixing is effected by mechanical stirring or other thorough agitation means. Such mixing with the proper quantity of digested seed material will eliminate odors.

In Figure 1, the fresh sludge flows periodically or discontinuously from collecting means 1, 2, 3 or any combinations of same into distribution well 4. From this well it is pumped at relatively steady frequent intervals either stepwise into three or four successive digestion chambers or stages A, B, C and D by means of pump 6, distribution line 7, valves 8, 9, 10 and 11 and their respective branches 8', 9', 10' and 11' and inter-tank sludge lines 20, 21, and 22 or it may be pumped at timed frequent intervals through line 7, thence through distribution valves 8 and 9 and branches 8' and 9' to tanks A and B or through any single branch leading from the distribution line 7 such as 8' into digestion stage A from whence it proceeds to the following stages B, C, and D by way of inter-stage lines 20, 21, 22 and lines 23 and 24 into final secondary stages E and F.

Simultaneously with transfer of fresh sludge into successive, multiple digestion stages, some digested material containing seed culture is conducted from any of the final digestion tanks, D, E or F through lines D15, E15 or F15 and valves 12, 13, or 14 through control pump, or other flow control device 16 to the return seed line 17 back to distribution well 4 where it is thoroughly mixed with the fresh sludge for purposes of incubating this sludge with proper bacterial culture and incidentally for regulating the hydrogen ion concentration (pH) of the sludge mixture pumped to the multiple stages of digestion and controlling the odor in the distribution well. For this mixing, the sludge distribution well may be equipped with a stirring mechanism 5. Compressed air or any other means of mixing the returned digested sludge containing incubating seed with fresh sludge before delivering the mixture to successive digestion stages may be used instead. Branch 19', leading to branch 8' through valve 19 is provided for by-passing well 4 with recirculating seed if desired.

In Figure 1 G, H, I, K and L indicate heat exchangers for maintaining the proper digestion temperature. The maximum mesophilic digestion temperature is approximately near that of the normal human body, i.e., approximately 95 to 100° F. or 37° C. Mesophilic temperature usually ranges from about 29° C. to this maximum. Heat for the multi-stage digestion system may be supplied by any of the modern methods. For example, some of the digestion gas may be used to heat water which in turn may be used in a heat exchanger so that the water heated therein is recirculated around tubes through which the sludge flows as it progresses through the exchanger. Alternatively, the heating water may be vaporized and used as hot steam which is injected directly into the sludge progressing through the digestion system. The application of the heat to the sludge may be automatically regulated by properly installed thermostats.

Digesting the sludge at a temperature of about 37° C. produces a well digested, stable product in ten days or less time in the present invention. In this zone of moderate temperatures the common (mesophilic) organisms are active and produce a stabilized sludge that is relatively rich in fertilizing values. At a higher temperature range, heat-loving (thermophilic) organisms are responsible for digestion (50 to 60° C.) which is completed in our system in two days or less time. However, the resulting digested material contains less nitrogen than does that produced by the mesophilic organisms. The digested sludge produced in the thermophilic range may, therefore, have less value as a fertilizer. The ultimate use to which the digested material will be put will, therefore, more or less determine the heating range for digesting the sludge. In any case, the bacterial decomposition of the organic fraction of the sewage solids will take place more rapidly in our novel sludge digestion system which we have chosen to term "step-loading." The fresh sludge, after being properly seeded, is introduced in regulated amounts either at one or two points or throughout the course of flow of the digesting material through the multiple digestion tanks.

Another novel feature of our invention resides in the ability to choose the type of recirculated seed, i.e., digested sludge containing anaerobic culture over a wider range of solids and alkalinity concentration as well as chemical nature than has been the case heretofore. To this end, the digesting and the digested solids arriving in the final storage tank F are degassed and washed relatively free of imbibed gas and any accumulated organic acids or alkalinity by the introduction of wash water through line 28 and meter 32 at 24. This water may be purified plant effluent or other water relatively purer than the fouled water associated with the digesting and digested solids. Its primary function is to degas the solids. This so alters their specific gravity that they settle more rapidly to a sludge of higher solids content than is otherwise possible. Its secondary use is to wash out undesirable volatile organic acids that may accumulate during the rapid digestion process. During normal anaerobic digestion the alkalinity of the liquor associated with the digesting solids should increase. However, the undue production of organic acids leads to acid digestion which inhibits proper anaerobic digestion and results in the liberation of offensive odors. Alkaline digestion is, therefore, conducive to the proper exercise of beneficial digestion. In degassing the digesting solids and concentrating them in the final stages of digestion excess alkalinity is incidentally removed. However, as long as the volatile acid concentration is kept well below the concentration of alkalinity and the hydrogen ion concentration (pH) of the sludge moisture is kept near 7 or slightly above, namely, a pH of from about 7 to about 7.3, preferably a pH of about 7.3, anaerobic digestion will proceed satisfactorily and rapidly.

In order to initially establish proper anaerobic digestion, the evolution of volatile acids must be kept at a minimum. This evolution manifests itself by excessive foaming. Freshly settled sewage solids are normally neutral or slightly alkaline. The pH value may vary from 6.8 to 7.2. Within 24 hours after collection this action changes to the acid side, especially in warm weather. The longer the solids are held, the more acid and foul smelling the stored mass becomes. This is known as the acid digestion phase. It can be shortened and completely eliminated by providing suitable and ample seeding material which is constantly mixed with the fresh sludge intended for the digestion chambers. This means there are two courses of sludge digestion. When acid digestion starts, alkaline anaerobic digestion is definitely delayed. This occurs when digestion is incorrectly started or when the proper proportion of seeding culture to fresh sludge is lost or interrupted during recirculation procedures. This proportion should be 20% or more of the alkaline seed by volume and even more, up to about 50% with fresh sludges rich in organic solids. A proportion of two parts of fresh sludge to one of seeding sludge insures the establishment of alkaline digestion which proceeds at an accelerated rate with rapid decomposition of the organic solids and production of copious amounts of methane (about 75%) and some carbon dioxide (about 25 to 30% by volume) and nitrogen. The primary objective is, therefore, the establishment and continued development of alkaline digestion. To this end, our invention is particularly designed and adapted.

The storage of sewage solids in tanks designed for collecting fresh solids is undesirable since acidity rapidly increases and lengthens the period of digestion if seeding material is insufficient. The initially collected solids should, therefore, not be allowed to become acid. Sewage solids do, however, become acid, when there is not enough properly digested seed present to prevent the formation of fatty acids by neutralization. When proper seed is not available at the beginning of digestion operations or when too much seed has been withdrawn from the digestion system to prevent acid formation, chemical reagents such as lime or ammonium salts, e.g. ammonium sulfate and ammonium carbonates may be used for the control of organic acids. To this end, small amounts of lime may be used, i.e. about 50 pounds of CaO per 1,000 population per week until proper alkaline digestion is well established. The ammonium salts and lime are valuable for initiating the proper environment for anaerobic bacterial activity. Dried cow manure and certain commercial enzymes, known as "biocatalysts" are likewise valuable for this purpose.

In order to minimize the amount of lime or ammonium salts usually employed, the lime or salts must be thoroughly and frequently mixed with the sludge before introducing the mixture to the digestion tanks. With our present invention this is not only easily done but the amount of lime or ammoniacal agents employed is either greatly reduced below the foregoing quantity per thousand population or entirely eliminated.

In the first place, with constant return of seed to the distribution well and constant circulation provided by pump 6, ideal conditions are provided for regulating the pH of the recirculated seed with small amounts of lime or other alkalinizing agents to any desired extent. In the second place, it is a known fact that digested sludge contains less than 200 mg. per liter of volatile acids, has no objectionable odors, digests rapidly, and dries rapidly on sludge beds. In cases where acid digestion may tend to start, the return seed drawn from tanks E and F, and especially from tank F will have most volatile acids removed by the sludge washing and compacting process. This sludge can then have its hydrogen ion concentration regulated at will very easily through proper sludge washing and, if necessary, further slight chemical regulation at point 4' or else by arrangement of the piping and valves between tanks D, E and F and the distribution well 4 and other digestion tanks and their valves 8, 9, 10 and 11. The return sludge used for seeding must be neutral or slightly alkaline up to a pH of 7.3 and usually having a pH of 7.2 in order to provide proper buffer action or to neutralize any acid reaction originating in the undigested sludge being fed to the digestion system.

Although valves 12, 13 and 14 are shown in the diagram of Figure 1 as being located at a common elevation on tanks D, E and F, this will not necessarily be the case in actual practice. With the attainment of good digestion, the return seed culture may be drawn from various tank levels or manifold valves 12, 13 and 14 and returned through common pipe header 17 and pump 16 to well 4 where it is thoroughly mixed with fresh sludge and properly distributed to the digestion stages A, B, C and D. With well digested sludge the seed may be most prevalent in the supernatant liquid withdrawn from tank D. In this case it may be withdrawn from a higher tank level and mixed with heavier washed sludge withdrawn from either or both tanks E and F. This permits a variety of operations and controls not possible with conventional digester operations. The supernatant seed withdrawn from a higher level of tank D will obviously have a high alkalinity with the system properly functioning while the heavier washed sludge withdrawn from the final tank or tanks will have a low content of volatile acids. Proper combinations of both as recirculating seed culture will not only accelerate proper digestion and gasification but materially aid in the production of a very heavy final sludge and very clear final digester overflow liquor. It is a well-known fact that good sludge digestion produces relatively clear digester overflow. It is also a well-known fact that washing digested sludge in the final digestion tank or between stages of digestion, according to existing Genter and Genter-Kennedy patents, materially aids in degassing the suspended solids and clarifying the digester overflow while producing a heavy final sludge. These facts combined with a construction of multiple stage, relatively small tanks, not disclosed in prior art and constant feeding and seeding equipment, offers remarkable economies over conventional structures and methods of thoroughly digesting various types of fresh sludge.

The concentrated sludge destined for final disposal is separated from the returned seed in lines D15, E15 and F15 through valves 12', 13' and 14' and diverted into disposal line 47.

In prior Genter and Genter-Kennedy patents, insufficient attention is paid to conservation of sludge gas developed during the digestion processes. In our present invention the gas production can be pushed to further economic limits and the genertaed gas can be given a richer methane content. In the Genter-Kennedy patent, the interstage sludge washing takes place largely between active and inactive stages with the consequent loss of some gas while the consolidation of the washed solids may take place largely within the final inactive digestion storage chamber under the hereinbefore-mentioned quiescent flow conditions. In the present invention the washing can take place in the final tank or tank compartments. In order to conserve some of the heat due to washing the sludge in the last tank F, the relatively cold water added to the sludge displaced from tank E to tank F will displace relatively clear overflow into storage tank 25 which overflows a major fraction into conduit 26. The remaining fraction is circulated by pump 27 through line 29 and meter 32' to mixing trough 31. This remaining fraction has received some heat from the sludge displaced from tank D to E and E to F. The sludge washing can, therefore, be countercurrent if heat conservation and more thorough removal of detrimental solutes, like phopshates and other mineral salts from the natural digestion liquors is found to be of advantage in degassing of the digested solids and the thickening of the degassed solids in the final storage tank or tanks of the digestion system. As the digestion liquor of the last stage F would without the washing process contain rich quantities of dissolved organic and mineral decomposition products, single stage washing may not be thorough enough to effectively remove such compounds. For this reason countercurrent washing in the two last stages, E and F, is shown with removal of the major elutriate fraction at 26 and return of the minor fraction through pump 27, line 29 to mixing trough 31, and, if necessary, adding some heat to the pumped water 29 at L. This heating may be of added value if (1) extra gas production is desired in the final sludge storage stages, (2) conservation of some of the heat is desired in these stages, and (3) washing out of some of the carbon dioxide from the gas evolved in these stages with enrichment of the resulting gas is desired, due to the fact the wash water dissolves and removes from the gas considerably more carbon dioxide than methane.

In order to avoid building up of the concentration of dissolved substances in the recirculated wash water it will be necessary to subtract or discard more elutriate at 26 and 26' than is returned through pump 27 and recirculating line 29 when countercurrent washing is used.

With proper construction and piping, the added wash water can be turbulently mixed with the digesting and digested sludges being displaced through interstage lines 23 and 24 directly therein as indicated in Figure 1. This eliminates the necessity of special mixing and settling tanks as shown in the Genter-Kennedy reference. In view of the fact that the seed culture and fresh sludge mixture in the present invention may at times be continuously operated and not in intermittent spurts or gushes, the wash water flow can likewise be made continuous. This will automatically insure thorough mixing of sludge and water in the troughs or pipes where the sludge and water meet and mingle. This mixing can be either in an open trough or by jetting the water into the sludge in a common pipe in such a manner that the water velocity is sufficient to produce turbulent flow of both water and sludge in a common header leading the mixture to the following compartment as indicated in Figure 1. Following the turbulent mixture of water and sludge in the interstage lines the diluted mixture is purposely brought under quiescent flow conditions in order to promote the rapid gravity segregation of the washed suspended solids.

Even though washing in the two final tank compartments is shown, it should be emphasized single stage washing in one final tank may be resorted to if such washing will remove sufficient dissolved products from the sludge liquor. In this case, tank E of the multistage series can be utilized for extra digestion space.

If desired, both the transportation of fresh sludge from the mixing and distribution well 4 and the elutriating water through line 28 (and 29, if it is used), can be concomitant or simultaneous when fresh sludge is moved from the distributing well into the digesters A, B, and C at the desired frequent intervals, or the water feeding rate may be set at constant rate with the sludge pumping rate set at a frequent discontinuous rate.

The pumping rate from the well can be automatic or float operated so that when a predetermined level is reached a float can start both the feed pump and water supply. If the water supply is allowed to run continuously the water will flow into a sludge mixing trough, or into sludge line 24 of Figure 1. Whenever sludge is pumped or fed by gravity into any of the early digestion units, the entering sludge will automatically displace partially digested and more completely digested sludge from any tank into the next successive tank. Sludge displaced through connecting lines 23 and 24 between tanks D and E and E and F will meet and be mixed with wash water either in sludge lines 23 and 24 of Figure 1, or in troughs which may be provided.

The multiple tank arrangement in Figure 1 can be carried out in a variety of arrangements, e.g., in a straight line arrangement or in a circular arrangement.

It should be emphasized that the multiple stage digestion system of Figure 1 may be so arranged that either fewer or more digestion and washing compartments result. Although six have been indicated, four for digestion and two for washing and solids concentration, if necessary, five may be used for digestion and one for washing and solids concentration. Even fewer tank compartments may be employed, e.g., two for active digestion and one for final solids washing and concentration.

In view of the fact the active digestion compartments are deliberately designed and operated to thoroughly mix and prevent zoning of the ingredients of the inoculated sludge to promote rapid decomposition and the washing compartment or compartments are deliberately designed and operated to promote zoning and gravity segregation of the washed solids from a relatively clear supernatant, in Figure 1 the elutriation compartments E and F, or their alternative compartment F for single-stage washing can be isolated from the arrangement shown and all compartments converted into fewer units for successive active sludge digestion. The digested sludge mixture then leaving the digestion system can be diluted with water while the transporting power of the progressively agitated digesting material is adequately reduced so the degassed, washed solids can rapidly settle in a tank or tanks isolated from the active digestion compartments. The concentrated, washed solids can then be stored in another reservoir sufficiently large to take care of fluctuations in sludge disposal. If gas evolution has been practically completed with the initiation of final sludge storage, the storage reservoir need not be completely covered.

The successful functioning of the digestion tank arrangements shown also depends on the frequency of feeding the well-seeded fresh sludge to the multiple tank system and the step method of so doing. Fresh sludge can be pumped from the plant sedimentation tanks into distribution well 4 at any desired daily intervals and mixed with the proper amount and nature of seed sludge. Both are intimately mixed by any convenient method of agitation and the mixture is permitted to flow at regularly timed intervals either into the first half of compartment A alone of Figure 1 or into A, B and C through timing valves attached to inlet pipes 8, 9, 11, etc. Such valves, for example, may be mechanically rotated plug valves with their timing mechanism set at any desired time interval. This means that both fresh and seed sludge can be delivered into the distributing well at any convenient time period and in any desired proportion and constantly mixed. Subsequently, the mixture can be delivered into the digestion compartment or compartments at closely timed intervals through the rotating plug valves in order to secure a relatively constant feed of well-seeded fresh sludge.

It will be appreciated that various modifications can be made in the invention as described above without in any way deviating from the scope thereof as defined in the appended claims.

We claim:

1. A multi-stage process of treating fresh sludge whereby it is converted into processed sludge suitable for delivery to sludge beds, comprising the steps of (1) conducting fresh sludge to a sludge receiving and distributing unit, (2) mixing the fresh sludge with at least partially processed sludge containing anaerobic bacteria to form an inoculated fresh sludge with an alkaline pH (3) feeding the inoculated fresh sludge from said distribution unit to a first stage series of at least two digestion units wherein the sludge is heated, progressively turbulently agitated and digested while traveling therethrough so as to form a digested sludge mixture, including a sludge liquor and sludge solids (4) subsequently moving the digested sludge mixture to at least one unit in a second stage wherein the velocity and turbulence of the digested sludge mixture is reduced by dilution with water purer than the sludge liquor and the gaseous products are separated by gravity from the digested sludge mixture diluted with the water (5) withdrawing at least part of the sludge solids from the digested sludge mixture diluted with the water for disposal and (6) returning a controlled portion of the digested sludge mixture containing anaerobic bacteria from at least one unit subsequent to the first digestion unit to the only sludge receiving and distribution unit for inoculation of fresh sludge with anaerobic bacteria and for maintaining the inoculated fresh sludge with an alkaline pH.

2. The process of claim 1 including the step of maintaining the entire process under alkaline conditions.

3. The process of claim 2 including the step of mixing approximately 2 parts of fresh sludge with one part of said digested sludge mixture containing anaerobic bacteria.

4. The process of claim 1 including the step of adding an alkaline reacting chemical to the fresh sludge in order to initiate alkaline digestion conditions.

5. The process of claim 1 wherein a portion of the digested sludge mixture from the second stage containing anaerobic bacteria is also returned to at least one first stage digestion unit.

6. The process of claim 1 wherein a portion of the digested sludge mixture from the second stage containing anaerobic bacteria is returned to more than one of the first stage digestion units.

7. The process of claim 1 including the step of heating the inoculated fresh sludge at a temperature from about 29° C. to 37° C. while said inoculated fresh sludge is progressing through the first stage digestion units.

8. The process of claim 1 including the step of heating the sludge at a temperature from 37° C. to 60° C. while the sludge is progressing through the first stage digestion units.

9. The process of claim 1 wherein a portion of said digested sludge mixture is returned continuously to the distribution unit.

10. The process of claim 1 wherein a portion of said digested sludge mixture containing anaerobic bacteria is returned intermittently but at frequent intervals to the distribution unit.

11. The process of claim 1 wherein said second stage comprises two dilution and settling units and the process further includes the step of countercurrently washing the digested sludge in the second stage units whereby a more thorough removal of detrimental solutes is obtained.

12. The process of claim 1 wherein the progressive agitation of the sludge in the first stage units is aided by blowing compressed digestion gas through the sludge being digested and wherein the surfaces of such units are flushed with water whereby scum accumulations are destroyed.

13. The process of claim 1 wherein said returned portion of the anaerobically digested sludge mixture is taken from the first stage.

14. The process of claim 1 wherein said returned portion of the anaerobically digested sludge mixture is taken from the second stage.

15. The process of claim 1 wherein said returned portion of the anaerobically digested sludge mixture is taken from the first and second stages.

16. The process of claim 1 wherein the acid concentration is kept well below the concentration of alkalinity and the hydrogen ion concentration of the sludge mixture is kept between about 7 to about 7.3.

References Cited in the file of this patent

UNITED STATES PATENTS

| | | |
|---|---|---|
| 1,999,973 | Genter | Apr. 30, 1935 |
| 2,097,454 | Fischer | Nov. 2, 1937 |
| 2,188,847 | Streander | Jan. 30, 1940 |
| 2,190,598 | Fischer | Feb. 13, 1940 |
| 2,259,688 | Genter | Oct. 21, 1941 |
| 2,430,519 | Mallory | Nov. 11, 1947 |
| 2,528,649 | Genter et al. | Nov. 7, 1950 |
| 2,638,444 | Kappe | May 12, 1953 |
| 2,640,027 | McNamee et al. | May 26, 1953 |

OTHER REFERENCES

Multiple-Stage Sewage Sludge Digestion, Rawn et al., Proceedings of A.S.C.E., vol. 63, 1937, pages 1673 to 1699.

Garber; Plant-Scale Studies of Thermophilic Digestion at Los Angeles; Sewage and Ind. Wastes, vol. 26, #10, Octber 1954, pages 1202 to 1216.